(12) United States Patent
Perez et al.

(10) Patent No.: US 9,507,766 B2
(45) Date of Patent: Nov. 29, 2016

(54) TREE TABLES FOR MOBILE DEVICES AND OTHER LOW RESOLUTION DISPLAYS

(71) Applicant: International Business Machines Corporation, Armonk, NY (US)

(72) Inventors: Rolando Perez, Poughkeepsie, NY (US); Christopher A. Robbins, Monroe Township, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 133 days.

(21) Appl. No.: 14/164,803

(22) Filed: Jan. 27, 2014

(65) Prior Publication Data
US 2015/0212998 A1    Jul. 30, 2015

(51) Int. Cl.
| G06F 17/00 | (2006.01) |
| G06F 17/24 | (2006.01) |
| G06F 17/22 | (2006.01) |
| G06F 3/0482 | (2013.01) |
| G06F 3/0484 | (2013.01) |
| G06F 17/21 | (2006.01) |

(52) U.S. Cl.
CPC ........... *G06F 17/245* (2013.01); *G06F 3/0482* (2013.01); *G06F 3/04842* (2013.01); *G06F 17/211* (2013.01); *G06F 17/2241* (2013.01)

(58) Field of Classification Search
CPC .................................................... G06F 17/245
USPC ......................................................... 715/808
See application file for complete search history.

(56) References Cited

U.S. PATENT DOCUMENTS

| 6,417,873 B1 | 7/2002 | Fletcher et al. |
| 6,496,842 B1 | 12/2002 | Lyness |
| 6,944,818 B2 | 9/2005 | Newman et al. |
| 7,360,175 B2 | 4/2008 | Gardner et al. |
| 7,363,593 B1 | 4/2008 | Loyens et al. |
| 8,001,155 B2 | 8/2011 | Danton et al. |
| 8,327,256 B2 | 12/2012 | Choudhury |
| 2002/0087516 A1* | 7/2002 | Cras et al. ........................ 707/2 |
| 2009/0049372 A1* | 2/2009 | Goldberg ...................... 715/227 |

(Continued)

OTHER PUBLICATIONS

Burch et al., "Indented Pixel Tree Browser for Exploring Huge Hierarchies", Proceedings of the 7th International Symposium on Advances in Visual Computing (ISVC 2011), Part 1, Springer-Verlag, Berlin; Sep. 26, 2011 to Sep. 28, 2011, pp. 301-312.

(Continued)

*Primary Examiner* — Keith Bloomquist
(74) *Attorney, Agent, or Firm* — Cantor Colburn LLP; William A. Kinnaman, Jr.

(57) ABSTRACT

In one embodiment, a computer-implemented method includes writing, into a tree content column of a tree table, content for a plurality of rows of the tree table. The content spans multiple hierarchical levels, and the content in each of the rows is commonly aligned within the tree content column. A level-indicating icon is associated with each of the hierarchical levels of the tree table. A first level-indicating icon for a first hierarchical level of the tree table is positioned in two or more distinct rows of the tree table having content in the first hierarchical level, and a second level-indicating icon for a second hierarchical level of the tree table is positioned in at least one row of the tree table having content in the second hierarchical level. The tree table is rendered by a computer processor.

15 Claims, 7 Drawing Sheets

(56) References Cited

U.S. PATENT DOCUMENTS

2009/0144606 A1* 6/2009 Vignet .................. 715/227
2009/0198725 A1 8/2009 Lee et al.
2010/0305970 A1 12/2010 McLaren et al.

OTHER PUBLICATIONS

IPCOM000143678D, Method for navigating complex directory structures via vertical lists, published Dec. 4, 2006; pp. 1-6.

Liechti et al., "The SGF Metadata Framework and its Support for Social Awareness on the World ide Web", World Wide Web, vol. 2, No. 4, Kluwer Academic Publishers Hingham, MA, USA; Apr. 1999; pp. 191-208.

Young, Sarah Varner, "A Comparison of Two Methods of Studying College Textbook Materials: Objectives Alone vs. Objectives Phrased as Adjunct Questions in a Learning Hierarchy with a Color-Coded Underlining System", Ph.D. Thesis, Florida State University, vol. 4206A of Dissertations Abstracts International, 1981, p. 2480, 396 pgs.

* cited by examiner

| Software / Product / Feature / FMID | Release | Product ID | Vendor | General Availability |
|---|---|---|---|---|
| ⊟ PokR11Prod (7) | | | | |
| ⊞ z/OS (12) | 01.11.00 | 5694-A01 | IBM | Oct 2010 |
| ⊞ IBM Compiler | 01.04.00 | 5695-013 | IBM | March 2011 |
| ⊞ IBM Library | 01.04.00 | 5695-014 | | |
| ⊞ CUSTOMPAC | 01.01.00 | 5695-129 | | |
| ⊟ Print Services Facility | 04.03.00 | 5655-M32 | IBM | March 2011 |
| ⊞ AFP Download Plus | | | | |
| ⊞ z/OSMF Download Services | | | | |
| ⊟ PSF for z/OS | | | | |
| ■ IBM-00001-7459-EMI2220 | | | | |
| ■ IBM-00001-74507-HBKQ330 | | | | |
| ■ EER3500 | | | | |
| ■ HBKM300 | | | | |
| ⊟ PokR12Staged | | | | |
| ⊟ NYCR12Test | | | | |

FIG. 1
PRIOR ART

| Software [1]/Product[2]/Feature[3]/FMID | Release | Product ID | Vendor | General Availability |
|---|---|---|---|---|
| ☐ PokR11prod | | | | |
| ⊞ z/OS | 01.11.00 | 5694-A01 | IBM | Oct 2010 |
| ⊞ IBM Compiler for REXX/370 | 01.04.00 | 5695-013 | IBM | March 2011 |
| ⊞ IBM Library for REXX/370 | 01.04.00 | 5695-014 | | |
| ⊞ CUSTOMPAC UTILITY | 01.01.00 | 5695-129 | | |
| ⊞ Print Services Facility | 04.03.00 | 5655-M32 | IBM | March 2011 |
| ⊞ AFP Download Plus | | | | |
| ⊞ z/OSMF Download Services | | | | |
| ⊞ PSF for z/OS | | | | |
| ■ IBM-00001-7459-EMI2220 | | | | |
| ■ IBM-00001-74507-HBKQ330 | | | | |
| PokR11Prod (Software) [1] / Print Services Facility (Product) [2] / PSF for z/OS (Feature) [3] / IBM-00001-74507-HBKQ330 (FMID) | | | | |
| ☐ PokR12Staged | | | | |
| ☐ NYCR12Test | | | | |

FIG. 3

TREE TABLES FOR MOBILE DEVICES AND OTHER LOW RESOLUTION DISPLAYS

Various embodiments of this disclosure relate to user interfaces of mobile devices and, more particularly, to tree tables for mobile device user interfaces and other low resolution displays.

A tree table is a user interface element that combines attributes of a table and attributes of a tree. A tree table contains a tree content column, where its rows of content are displayed as indented branches, sub-branches, and leaves, which maintain hierarchical relationships to one another. FIG. 1 is an example of such a tree table, as traditionally rendered.

Tree tables are common in a wide range of applications, such as system management, where hierarchical relationships of data are needed to provide proper context. However, when tree tables are displayed on a mobile device or other device with a low-resolution display, they have drawbacks that severely limit their usability.

For instance, the tree column of a tree table depends on significant indentation to indicate each level of the tree, which quickly uses valuable horizontal space. As the number of levels in the tree increases and more white space is needed for indenting, the actual amount of data shown in the low-resolution viewing area decreases. The user may be forced to depend on horizontal scrolling, at which point the table becomes unusable or a high burden for usability is created.

In a mobile application, typically only a small number of rows, e.g., five to ten depending on actual resolution, are viewable at once. As a result, when a user opens multiple levels of the tree content column, the user can quickly lose his or her place in the tree structure because the headers, or parent rows, of the row currently being viewed are scrolled out of the viewable area. In this case, usability may be negatively impacted as the user is forced to depend on vertical scrolling to keep track of the parent rows.

Some current mobile applications avoid the use of tree tables altogether in favor of flat tables. As a result, however, these applications lose the advantage of displaying hierarchical relationships that can be effectively illustrated in tree form.

SUMMARY

In one embodiment of this disclosure, a computer-implemented method includes writing, into a tree content column of a tree table, content for a plurality of rows of the tree table. The content spans multiple hierarchical levels, and the content in each of the rows is commonly aligned within the tree content column. A level-indicating icon is associated with each of the hierarchical levels of the tree table. A first level-indicating icon for a first hierarchical level of the tree table is positioned in one or more distinct rows of the tree table having content in the first hierarchical level, and a second level-indicating icon for a second hierarchical level of the tree table is positioned in at least one row of the tree table having content in the second hierarchical level. The tree table is rendered by a computer processor.

In another embodiment, a system includes a content unit, a level-indicating unit, and a rendering unit. The content unit is configured to write, into a tree content column of a tree table, content for a plurality of rows of the tree table. The content spans multiple hierarchical levels, and the content in each of the rows is commonly aligned within the tree content column. The level-indicating unit is configured to associate a level-indicating icon with each of the hierarchical levels of the tree table. A first level-indicating icon for a first hierarchical level of the tree table is positioned in one or more distinct rows of the tree table having content in the first hierarchical level, and a second level-indicating icon for a second hierarchical level of the tree table is positioned in at least one row of the tree table having content in the second hierarchical level. The rendering unit configured to render the tree table.

In yet another embodiment, a computer program product includes a computer readable storage medium having computer readable program code embodied thereon. The computer readable program code is executable by a processor to perform a method. The method includes writing, into a tree content column of a tree table, content for a plurality of rows of the tree table. The content spans multiple hierarchical levels, and the content in each of the rows is commonly aligned within the tree content column. Further according to the method, a level-indicating icon is associated with each of the hierarchical levels of the tree table. A first level-indicating icon for a first hierarchical level of the tree table is positioned in one or more distinct rows of the tree table having content in the first hierarchical level, and a second level-indicating icon for a second hierarchical level of the tree table is positioned in at least one row of the tree table having content in the second hierarchical level. The tree table is rendered.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates an example traditional tree table;

FIG. 3 illustrates an enhanced tree table, according to some embodiments of this disclosure;

DETAILED DESCRIPTION

Figure 2:
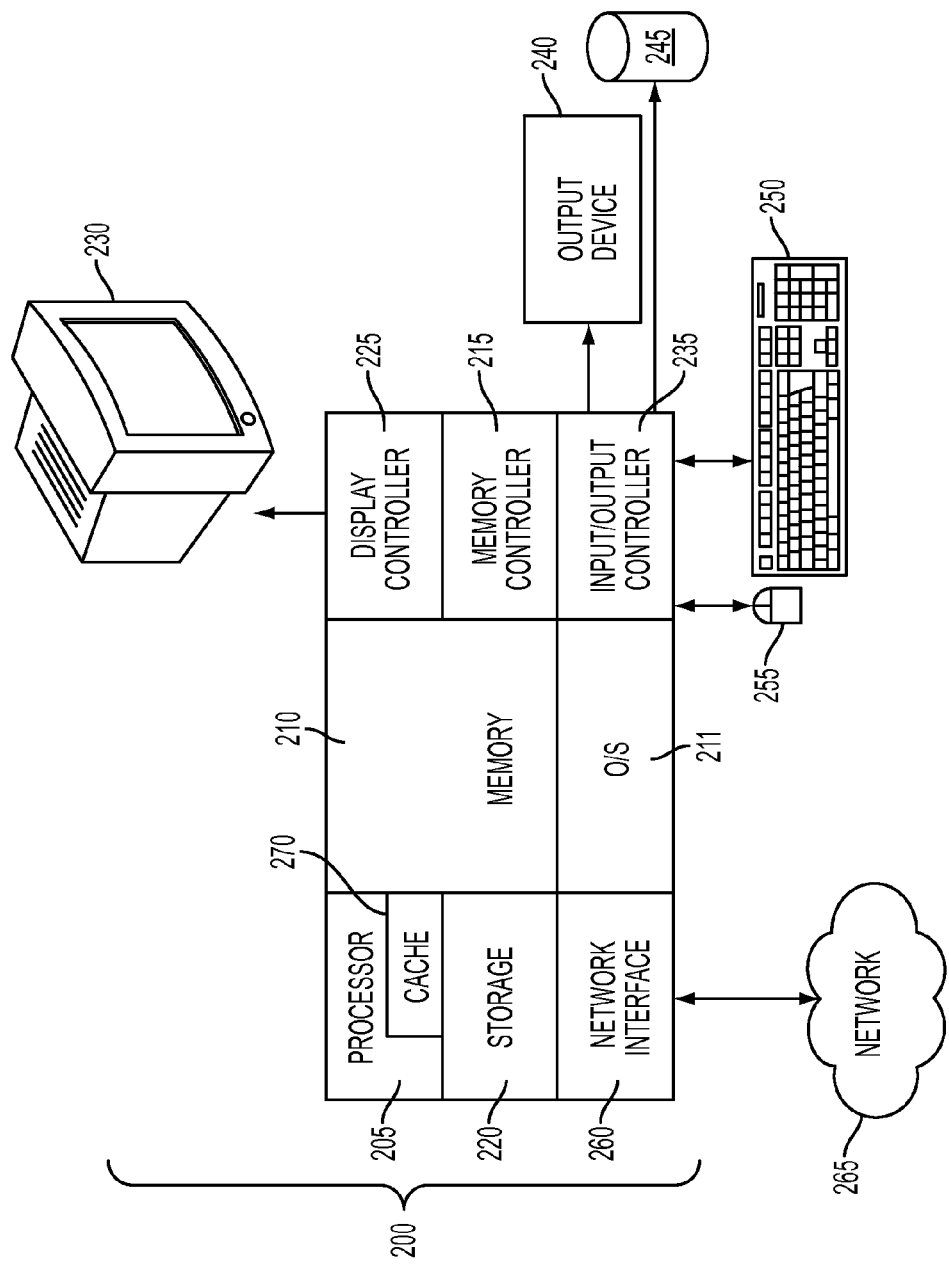
FIG. 2 is a block diagram of a computing device for implementing some or all aspects of an enhanced tree table, according to some embodiments of this disclosure.

FIG. 2 illustrates a block diagram of a computer system 200 for use in implementing a tree-table system or method according to some embodiments. The tree-table systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 200, such as a personal computer, workstation, minicomputer, or mainframe computer.

In an exemplary embodiment, as shown in FIG. 2, the computer system 200 includes a processor 205, memory 210 coupled to a memory controller 215, and one or more input devices 245 and/or output devices 240, such as peripherals, that are communicatively coupled via a local I/O controller 235. These devices 240 and 245 may include, for example, a printer, a scanner, a microphone, and the like. A conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be any custom made or commercially available processor, a central processing unit (CPU), an auxiliary processor among several processors associated with the computer system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, etc.).

The memory 210 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the tree-table systems and methods of this disclosure.

The computer system 200 may further include a display controller 225 coupled to a display 230. In an exemplary embodiment, the computer system 200 may further include a network interface 260 for coupling to a network 265. The network 265 may be an IP-based network for communication between the computer system 200 and any external server, client and the like via a broadband connection. The network 265 transmits and receives data between the computer system 200 and external systems. In an exemplary embodiment, the network 265 may be a managed IP network administered by a service provider. The network 265 may be implemented in a wireless fashion, e.g., using wireless protocols and technologies, such as WiFi, WiMax, etc. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Tree-table systems and methods according to this disclosure may be embodied, in whole or in part, in computer program products or in computer systems 200, such as that illustrated in FIG. 2.

FIG. 3 illustrates a tree table 300, which is an enhanced tree table 300 as compared to the traditional tree table of FIG. 1, according to some embodiments of this disclosure. According to some embodiments, a tree table 300 may be user friendly on mobile devices and other devices with low-resolution displays, on which traditional tree tables may prove unusable or inconvenient. To this end, a tree table 300 according to some embodiments may take better advantage of available space, thus reducing or removing indentations, while at the same time providing cues to indicate the various levels of the tree.

As shown, the tree table 300 may include one or more of the following characteristics: (1) each level in the tree hierarchy is assigned and identified by a unique color corresponding to the that level and consistent throughout that level regardless of the current row; (2) each level in the tree hierarchy is assigned and identified by a unique number corresponding to the that level and consistent throughout that level regardless of the current row (e.g., the top level is assigned 1, the second level 2, the third level 3, etc.); (3) a dedicated column in the tree includes one or more icons for each row, where the icons indicate the corresponding number, color, or both for the tree level associated with that row; (4) each row includes a thin horizontal line, which indicates the associated tree level, along the bottom the tree table row or near the tree table row, where the line has a color corresponding to that row's tree level, or has a length representing (e.g., proportional to) the row's corresponding number, or has both the corresponding color and length; (5) the tree column rows are not indented; and (6) upon prompting, the tree table is configured to display information about the levels in the hierarchy above and leading to the current row.

Figure 4A:
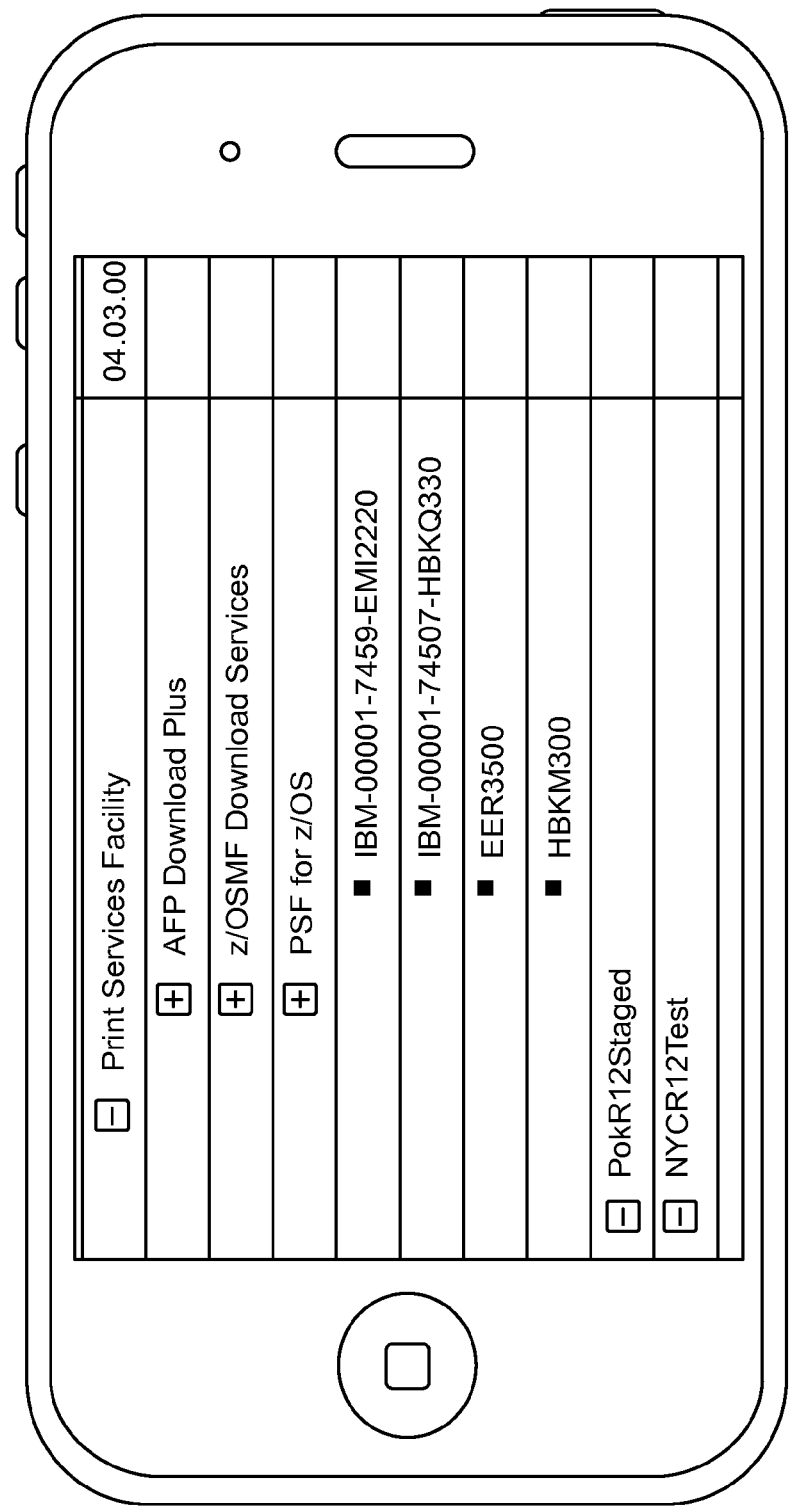
FIG. 4A illustrates a traditional tree table displayed on a mobile device.
Figure 4B:
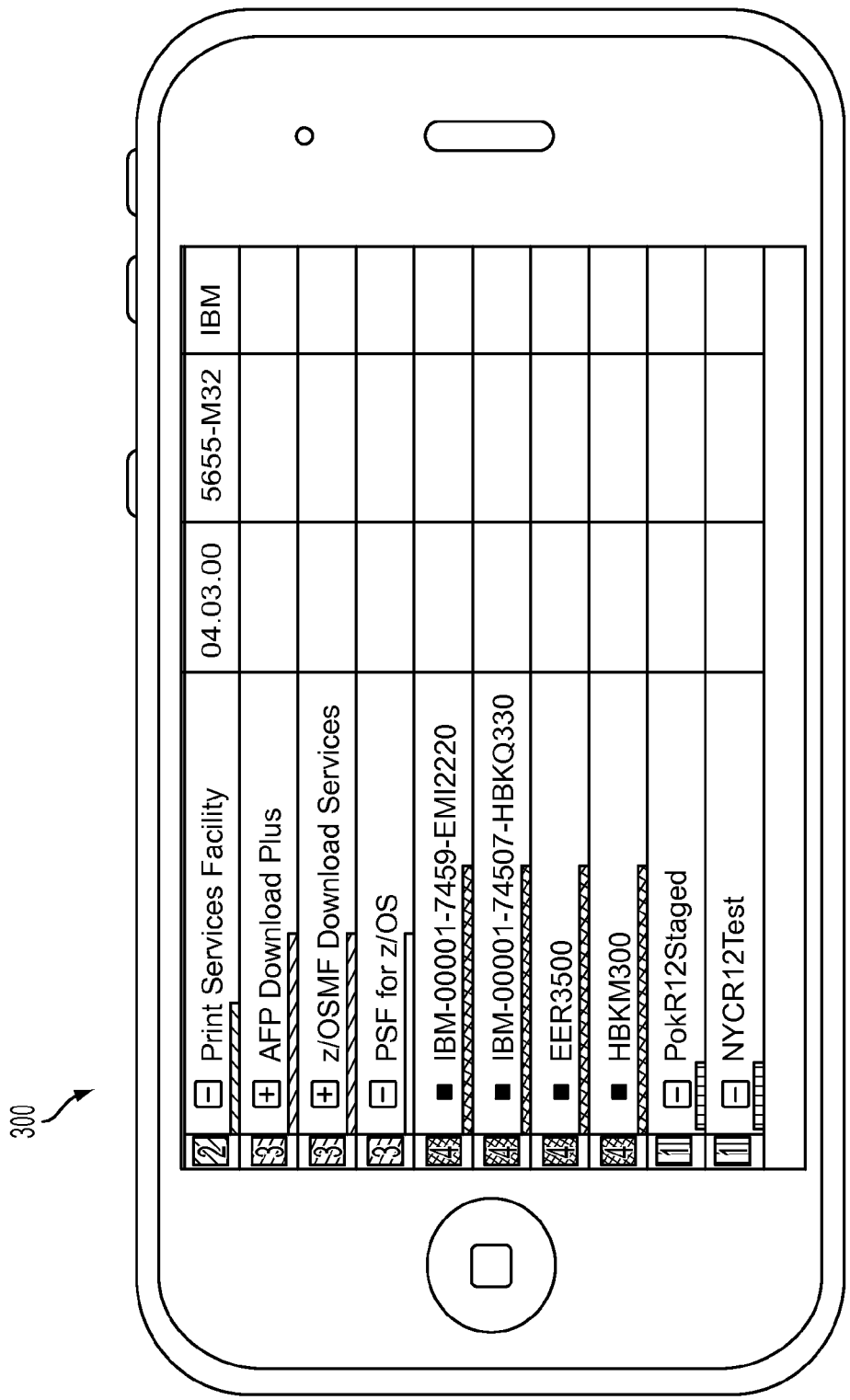
FIG. 4B illustrates an enhanced tree table displayed on a mobile device, according to some embodiments of this disclosure.

In FIGS. 3 and 4B, differences in color of various aspects of the tree table 300 are illustrated by differences in shading or pattern. Further, it will be understood that, in some embodiments, shading or patterning may be used as a type of coloring to represent various hierarchical levels of the tree table 300.

As shown, the tree table 300 may present hierarchically oriented data on limited-display-size devices, such as tablets and smartphones. At least some of the content of such data may be displayed in a tree content column 305, which may include information to be conveyed through use of the tree table 300. This tree content column 305 is where a traditional table would include indentations, which need not be used in the enhanced tree table 300.

In some embodiments, as mentioned above, a dedicated level-indication column 310 may include level-indicating icons 320 displaying the color, number, or both representing a current level of the tree table 300 for each row. In the example shown, these numbers are integers ordered according to column level, where 1 represents level one, 2 represents level two, and so on. Further, each level-indicating icon 320 for a particular level may be a certain level-indicating color in addition to displaying the level-indicating number. For instance, for the top level of the tree table 300, the number 1 may be displayed in the level-indicating color, or may be surrounded by a box or circle of the level-indicating color. In that case, all level-one level-indicating icons 320 may similarly include a number 1 and the same level-indicating color.

As additionally mentioned above, a level-indicating line 330 may underscore each row of the tree table 300 or may be otherwise displayed proximate the each row. The line 330 for each row may be displayed in the corresponding level-indicating color, and may have a length proportional to, or otherwise indicative of, the level-indicating number. For instance, the line 330 for a level-four row may be four times the length of the line 330 for a level-one row, and may be twice the length of the line 330 for a level-two row.

Accordingly, when a user views the tree table 300, the level of a current row may be perceived based on the level-indicating icon 320, the level-indicating line 330, or both, which may represent a current tree level using color, numbers, or some other form of indication. Therefore, it need not be necessary for the various rows to be indented to indicate the respective tree level of each row. The content for each row may thus be aligned on one side, e.g., the left side for a left-to-right language. As a result, space on the display need not be wasted by white space used for indentations.

In some embodiments, an expansion column 340 may be included in the tree table 300, enabling the user to expand or collapse various levels of the tree. For each row, the expansion column 340 may include an indication of whether the current tree row has child rows (i.e., one or more lower levels of the tree branching off the current row) and may further enable the user to expand or collapse such child rows. For instance, as shown, a dynamic expansion icon may be included for each non-leaf row in the expansion column 340, where each expansion icon includes a plus sign, a minus sign, or an indication that the current row is a leaf row (i.e., has no child rows). The plus sign, or other relevant symbol, may indicate that child rows exist but are not shown. When the user selects the plus sign on a current row, one or more additional rows may be added dynamically directly below the current row, where the additional rows represent child rows of the current row. In that case, the selected plus sign may change to a minus sign, or other relevant symbol, indicating that the current row is expanded and child rows are shown. Thus, the minus sign may indicate that child rows exist and are currently being displayed. When the user selects a minus sign on the current row, the child rows may then collapse, being dynamically removed from display, and the icon in the expansion column 340 may then become a plus sign, or other relevant symbol being used to represent the fact that child rows exist but are not shown.

In some embodiments, the tree table 300 may include one or more additional features for providing immediate access to the hierarchy of a current row, upon prompting from the user, without the user having to scroll upward to view the parent rows of the current row. For example, when a current row is selected (e.g., by hovering a cursor over the row, by clicking the row, by selecting the level-indicating icon 320, or by some other predetermined manner of selection), the tree table 300 may display a hierarchy indicator 350 representing of the parent rows of the current row. For instance, the hierarchy indicator 350 may be a dialog, pop-up window, or flyover window. For example, and not by way of limitation, the hierarchy indicator 350 may include some or all content from the parent rows, where each parent row content may be displayed in the hierarchy indicator 350 along with its level-indicating icon 320, as shown in FIG. 3, or may otherwise be associated with its own level in the tree table 300.

Through inclusion of the hierarchy indicators 350 in the tree table 300, every row may inform the user of its entire hierarchy regardless of how far vertically removed that row is from its various parent rows. As a result, the user need not scroll upward and downward in the tree table 300 to establish the complete parental hierarchy of a row in the tree table 300. Rather, the user may simply prompt the tree table 300 to display the hierarchy of a row when the user desires to view such information.

FIG. 3 illustrates an enhanced tree table 300 of the same tree illustrated as a traditional tree table in FIG. 1, and has the same rows expanded as are expanded in FIG. 1. As shown, due to the various improvements of the enhanced tree table 300 over a traditional tree table, the enhanced tree table 300 of FIG. 3 takes better advantage of the limited space available.

To further compare a traditional tree table to an enhanced tree table 300, FIG. 4A illustrates the same traditional tree table as in FIG. 1, shown on a display screen of a mobile device, while FIG. 4B illustrates the same enhanced tree table 300 as in FIG. 3, shown on a display screen of a mobile device.

In both of FIGS. 4A-4B, the traditional tree table and the enhanced tree table 300 have been scrolled to show lower portions of the tree tables. In FIG. 4A, the hierarchy of the rows shown on the mobile device has been lost, as a result of the scrolling in the traditional tree table. A user would have to scroll back up to see the full hierarchy and thereby gain context for what he is seeing on the display. In contrast, due to the level-indicating lines 330 and the level-indicating icons 320, the enhanced tree table 300 may provide some context for each row even without the hierarchy indicator 350, which may present further context when its display is promoted by the user.

Figure 5:
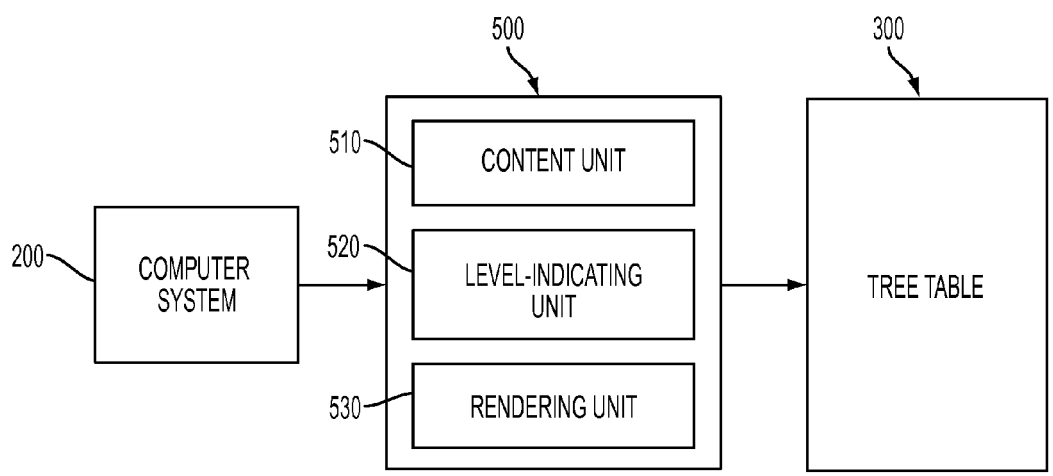
FIG. 5 is a block diagram of a tree-table system for providing an enhanced tree table, according to some embodiments of this disclosure.

FIG. 5 is a block diagram of a tree-table system 500 for providing an enhanced tree table 300, such as that illustrated in FIGS. 3 and 4B, according to some embodiments of this disclosure. The tree-table system 500 may be implemented, in whole or in part, through use of a computer system 200, such as that shown in FIG. 2. For example, a computer processor may execute a set of instructions to build and maintain the tree table 300.

The tree-table system 500 may include one or more units, each including hardware, software, or a combination of hardware and software, for producing or otherwise providing aspects of the tree table 300. As shown, some embodiments of the tree-table system 500 may include a content unit 510, a level-indication unit 520, and a rendering unit 530. In general, the content unit 510 may provide the content (e.g., the text or other objects) making up the various rows of the tree content column 305. The level indication unit 520 may provide, for each row, one or more indications of the current level of that row. For instance, the level indication unit 520 may provide the level-indicating icon 320, the level-indicating line 330, and the hierarchy indicator 350. The rendering unit 530 may output the resulting tree table 300 for which data is provided by the content unit 510 and the level indication unit 520.

Although the content unit 510, the level indication unit 520, and the rendering unit 530 are shown in FIG. 5 as being distinct components, it will be understood that this distinction is made for illustrative purposes only. In some embodiments, these units may include overlapping hardware, software, or both, or may be further divided based on implementation.

As implemented, a tree table 300 may be a graphical user interface (GUI) element, or widget, directed toward resolving critical usability issues in traditional tree tables when shown on low-resolution displays. Various GUI implementation technologies may be used by the tree-table system 500 to produce the tree table 300. For example, and not by way of limitation, an embodiment of the tree table 300 may be rendered by use of one or more web application widget libraries, such as Dojo, HTML5, or other libraries. Embodiments of the tree table 300 may be applicable to various mobile or traditional web browsers and platforms, including for example, iOS™ and Android™.

Figure 6:
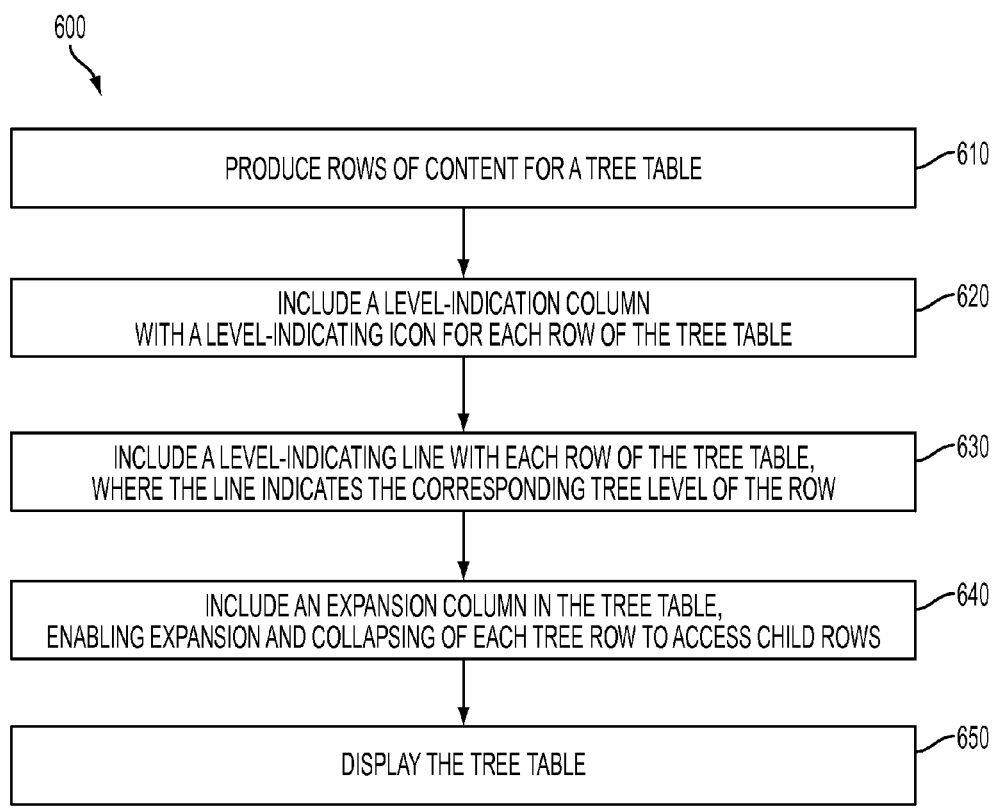
FIG. 6 is a flow diagram of a method for rendering an enhanced tree table, according to some embodiments of this disclosure.

FIG. 6 is a flow diagram of a method 600 for rendering an enhanced tree table 300, according to some embodiments of this disclosure. As shown, at block 610, various rows of content may be produced for the tree table 300, with each row including text or other data as an element in the tree content column 305 of the tree table 300. At block 620, a level-indication column 310 may be included in the tree table 300, where the column 310 includes level-indicating icons 320 for each row. The level-indicating icons 320 may present some indication of the corresponding tree level for each row. At block 630, a level-indicating line 330 may be included under or otherwise near each row of the tree table 300, where the line 330 also indicates a tree level of each row. At block 640, an expansion column 340 may be included in the tree table 300. When the tree table 300 is displayed, the expansion column 340 may enable a user to determine whether each row is currently expanded and further enable the user to expand or collapse rows as desired. At block 650, the resulting tree table 300 may be displayed to the user.

It will be understood that this method 600 is provided for illustrative purposes only and does not limit the various embodiments of this disclosure. For example, various blocks of the method may be performed out of order or removed from the method 600 entirely, and one or more additional blocks representing operations may be added to provide a desired implementation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    writing, into a tree content column of a tree table, content for a plurality of rows of the tree table, wherein the content spans a hierarchy comprising multiple hierarchical levels, wherein the content comprises first content and second content, and wherein a respective portion of the content in each of the plurality of rows is commonly aligned within the tree content column;
    rendering the tree table on a display of a mobile device, wherein the rendering is performed by a computer processor of the mobile device, and wherein the rendering comprises:
        rendering the first content in a first row of the plurality of rows;
        rendering the second content in a second row of the plurality of rows;
        rendering a first level-indicating icon in the first row to indicate that the first content is associated with the first hierarchical level; and
        rendering a second level-indicating icon in the second row to indicate that the second content is associated with a second hierarchical level that is subordinate to the first hierarchical level in the hierarchy;
    detecting a user scrolling action,
    re-rendering the tree table on the display of the mobile device in response to detecting the user scrolling action, wherein re-rendering the tree table causes the first content and the first level-indicating icon to no longer be rendered on the display of the mobile device;
    detecting a user interaction with the second row;
    in response to detecting the user interaction with the second row, rendering a hierarchy indicator as an overlay of the tree table at a position corresponding to the second row, wherein the hierarchy indicator comprises at least a portion of the first content so as to indicate that the second content is related to the first content in the hierarchy, and wherein the hierarchy indicator further comprises the first level-indicating icon that together with the second level-indicating icon indicates a number of intervening hierarchical levels between the first content and the second content in the hierarchy.

2. The method of claim 1, wherein the first level-indicating icon is a first color and the second level-indicating icon is a second color distinct from the first color.

3. The method of claim 1, wherein the first level-indicating icon comprises a first numeral and the second level-indicating icon comprises a second numeral distinct from the first numeral, and wherein a difference between the second numeral and the first numeral indicates the number of intervening hierarchical levels between the first content and the second content in the hierarchy.

4. The method of claim 1, wherein rendering the tree table further comprises rendering a level-indicating line in the first row, wherein the level-indicating line has a length representative of the first hierarchical level.

5. A The method of claim 4, wherein the level-indicating line is displayed in a level-indicating color representative of the first hierarchical level.

6. A system comprising:
a content unit configured to write, into a tree content column of a tree table, content for a plurality of rows of the tree table, wherein the content spans a hierarchy comprising multiple hierarchical levels, wherein the content comprises first content and second content, and wherein a respective portion of the content in each of the plurality of rows is commonly aligned within the tree content column; and
a rendering unit configured to render the tree table on a display of a mobile device, wherein rendering the tree table comprises:
rendering the first content in a first row of the plurality of rows;
rendering the second content in a second row of the plurality of rows;
rendering a first level-indicating icon in the first row to indicate that the first content is associated with the first hierarchical level; and
rendering a second level-indicating icon in the second row to indicate that the second content is associated with a second hierarchical level that is subordinate to the first hierarchical level in the hierarchy;
re-rendering the tree table on the display of the mobile device in response to detecting a user scrolling action, wherein re-rendering the tree table causes the first content and the first level-indicating icon to no longer be rendered on the display of the mobile device; and
in response to detecting a user interaction with the second row, rendering a hierarchy indicator as an overlay of the tree table at a position corresponding to the second row, wherein the hierarchy indicator comprises at least a portion of the first content so as to indicate that the second content is related to the first content in the hierarchy, and wherein the hierarchy indicator further comprises the first level-indicating icon that together with the second level-indicating icon indicates a number of intervening hierarchical levels between the first content and the second content in the hierarchy.

7. The system of claim 6, wherein the first level-indicating icon is a first color and the second level-indicating icon is a second color distinct from the first color.

8. The system of claim 6, wherein the first level-indicating icon comprises a first numeral and the second level-indicating icon comprises a second numeral distinct from the first numeral, and wherein a difference between the second numeral and the first numeral indicates the number of intervening hierarchical levels between the first content and the second content in the hierarchy.

9. The system of claim 6, wherein the rendering unit is further configured to render a level-indicating line in the first row, and wherein the level-indicating line has a length representative of the first hierarchical level.

10. The system of claim 9, wherein the level-indicating line is displayed in a level-indicating color representative of the first hierarchical level.

11. A computer program product comprising a non-transitory computer readable storage medium having computer readable program code embodied thereon, the computer readable program code executable by a processor to perform a method comprising:
writing, into a tree content column of a tree table, content for a plurality of rows of the tree table, wherein the content spans a hierarchy comprising multiple hierarchical levels, wherein the content comprises first content and second content, and wherein a respective portion of the content in each of the plurality of rows is commonly aligned within the tree content column;
rendering the tree table on display of a mobile device, wherein the rendering is performed by a computer processor of the mobile device, and wherein the rendering comprises:
rendering the first content in a first row of the plurality of rows;
rendering the second content in a second row of the plurality of rows;
rendering a first level-indicating icon in the first row to indicate that the first content is associated with the first hierarchical level; and
rendering a second level-indicating icon in the second row to indicate that the second content is associated with a second hierarchical level that is subordinate to the first hierarchical level in the hierarchy;
detecting a user scrolling action;
re-rendering the tree table on the display of the mobile device in response to detecting the user scrolling action, wherein re-rendering the tree table causes the first content and the first level-indicating icon to no longer be rendered on the display of the mobile device;
detecting a user interaction with the second row;
in response to detecting the user interaction with the second row, rendering a hierarchy indicator as an overlay of the tree table at a position corresponding to the second row, wherein the hierarchy indicator comprises at least a portion of the first content so as to indicate that the second content is related to the first content in the hierarchy, and wherein the hierarchy indicator further comprises the first level-indicating icon that together with the second level-indicating icon indicates a number of intervening hierarchical levels between the first content and the second content in the hierarchy.

12. The computer program product of claim 11, wherein the first level-indicating icon is a first color and the second level-indicating icon is a second color distinct from the first color.

13. The computer program product of claim 11, wherein the first level-indicating icon comprises a first numeral and the second level-indicating icon comprises a second numeral distinct from the first numeral, and wherein a difference between the second numeral and the first numeral indicates the number of intervening hierarchical levels between the first content and the second content in the hierarchy.

14. The computer program product of claim 11, the method wherein rendering the tree table further comprises rendering a level-indicating line in the first row, wherein the level-indicating line has a length representative of the first hierarchical level.

15. The computer program product of claim 14, wherein the level-indicating line is displayed in a level-indicating color representative of the first hierarchical level.

\* \* \* \* \*